US011391986B2

(12) United States Patent
Kim et al.

(10) Patent No.: US 11,391,986 B2
(45) Date of Patent: Jul. 19, 2022

(54) DISPLAY APPARATUS

(71) Applicant: SAMSUNG ELECTRONICS CO., LTD., Suwon-si (KR)

(72) Inventors: Sungho Kim, Suwon-si (KR); Chanhong Park, Suwon-si (KR); Junghyun Yoon, Suwon-si (KR); Hyojae Jang, Suwon-si (KR); Sungho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/162,701

(22) Filed: Jan. 29, 2021

(65) Prior Publication Data

US 2021/0240039 A1    Aug. 5, 2021

(30) Foreign Application Priority Data

Feb. 3, 2020    (KR) .................... 10-2020-0012586

(51) Int. Cl.
G02F 1/13357    (2006.01)
G02F 1/1333    (2006.01)
G02F 1/1335    (2006.01)

(52) U.S. Cl.
CPC .. *G02F 1/133603* (2013.01); *G02F 1/133314* (2021.01); *G02F 1/133317* (2021.01); *G02F 1/133606* (2013.01); *G02F 1/133614* (2021.01); *G02F 2202/36* (2013.01)

(58) Field of Classification Search
CPC .......... G02F 2202/36; G02F 1/133614; G02F 1/133606; G02F 1/133603; G02F 1/133314; G02F 1/133317
See application file for complete search history.

(56) References Cited

U.S. PATENT DOCUMENTS

| 10,908,455 | B2* | 2/2021 | Lim ................. G02F 1/133605 |
| 2007/0221943 | A1* | 9/2007 | Moriya ............ G02F 1/133603 257/99 |
| 2009/0115936 | A1 | 5/2009 | Takeuchi et al. |
| 2013/0050616 | A1* | 2/2013 | Seo .................. G02F 1/133603 349/71 |

(Continued)

FOREIGN PATENT DOCUMENTS

| CN | 105158954 A | 12/2015 |
| CN | 108488693 A | 9/2018 |

(Continued)

OTHER PUBLICATIONS

Communication dated Jun. 25, 2021 issued by the European Patent Office in European Application No. 21154106.5.

(Continued)

*Primary Examiner* — Jia X Pan
(74) *Attorney, Agent, or Firm* — Sughrue Mion, PLLC

(57) ABSTRACT

A display apparatus includes a display panel configured to display an image; a light source module provided behind a rear surface of the display panel and configured to emit light to the display panel, the light source module including a glass substrate and a light source provided behind a rear surface of the glass substrate; and a rear chassis covering the display panel and the light source module, wherein the light source is provided between the glass substrate and the rear chassis.

18 Claims, 7 Drawing Sheets

(56) References Cited

U.S. PATENT DOCUMENTS

| | | | |
|---|---|---|---|
| 2015/0055058 A1* | 2/2015 | Jang | G02B 6/0088 |
| | | | 349/65 |
| 2015/0219936 A1* | 8/2015 | Kim | G02F 1/133602 |
| | | | 362/97.1 |
| 2016/0259122 A1* | 9/2016 | Negoro | G02B 6/0068 |
| 2019/0097097 A1 | 3/2019 | Ko | |
| 2019/0312181 A1* | 10/2019 | Song | G02B 6/0026 |
| 2020/0110312 A1* | 4/2020 | Park | G02F 1/133617 |
| 2020/0133078 A1* | 4/2020 | Kim | G02F 1/133514 |
| 2021/0018796 A1* | 1/2021 | Lee | H04M 1/03 |
| 2021/0135066 A1* | 5/2021 | Watanabe | G02F 1/133614 |

FOREIGN PATENT DOCUMENTS

| | | | |
|---|---|---|---|
| CN | 108563069 A | | 9/2018 |
| CN | 108681118 A | | 10/2018 |
| CN | 109946880 A | | 6/2019 |
| JP | 2009158193 A | | 7/2009 |
| JP | 2012015070 A | | 1/2012 |
| JP | 4987711 B2 | | 7/2012 |
| JP | 2012227030 A | | 11/2012 |
| JP | 2019159342 A | | 9/2019 |
| KR | 20080075359 A | * | 8/2008 |

OTHER PUBLICATIONS

International Search Report (PCT/ISA/210) dated Jun. 1, 2021 issued by the International Searching Authority in International Application No. PCT/KR2021/001293.

* cited by examiner

DISPLAY APPARATUS

CROSS-REFERENCE TO RELATED APPLICATION

This application is based on and claims priority under 35 U.S.C. § 119 to Korean Patent Application No. 10-2020-0012586, filed on Feb. 3, 2020 in the Korean Intellectual Property Office, the disclosure of which is incorporated herein by reference.

BACKGROUND

1. Field

The disclosure relates to a display apparatus, and more specifically, to a display apparatus having an improved light emitting diode (LED) unit.

2. Description of Related Art

A display apparatus is a type of an output device that visually displays data information, such as characters and figures, images, and the like.

The display apparatus may include a self-light emitting display panel, such as an organic light-emitting diode (OLED), or a light-receiving and emitting display panel, such as a liquid crystal display (LCD).

The LCD display apparatus may include a display panel that displays a screen and a backlight unit that supplies light to the display panel.

With a recent trend toward slimness of the display apparatus, a narrow separation distance is provided between components forming the backlight unit, which may cause heat generated from a light source to be transferred to the components of the backlight unit, deteriorating the reliability of the backlight unit.

SUMMARY

Provided is a display apparatus capable of efficiently dissipating heat by an improved light source module.

Provided also is a display apparatus achieving slimness by increasing heat dissipation using an improved light source module.

According to an aspect of the disclosure, there is provided a display apparatus including: a display panel configured to display an image; a light source module provided behind a rear surface of the display panel and configured to emit light to the display panel, the light source module including a glass substrate and a light source provided behind a rear surface of the glass substrate; and a rear chassis covering the display panel and the light source module, wherein the light source is provided between the glass substrate and the rear chassis.

A rear surface of the light source may contact the rear chassis.

The display apparatus may further include an intermediate member provided between and contacting the light source and the rear chassis.

The light source may be configured to emit light from a side that is coupled to the glass substrate.

The light source may include an emitting surface through which light is emitted and a coupler coupled to the glass substrate, and the emitting surface and the coupler may be provided on a same side of the light source.

The glass substrate may be spaced apart from the rear chassis.

The rear surface of the glass substrate and the rear chassis may be spaced apart from each other by a length that is greater than a length that a rear end of the light source is spaced apart from the rear chassis.

The light emitted from the light source may be transmitted through the glass substrate and towards the display panel.

Light incident on the glass substrate, that is emitted from the light source, may be diffused and exit the glass substrate.

The glass substrate may include an opaque material.

The glass substrate may further include an exit surface arranged opposite to the rear surface and through which light exits in a direction towards the display panel, and the exit surface may include a pattern configured to diffuse light passing through the exit surface.

The display apparatus may further include a light conversion member including a quantum dot particle, the light conversion member being configured to convert a property of light passing through the glass substrate, wherein the light conversion member is provided between the rear surface of the display panel and the glass substrate.

The light conversion member may be provided on the glass substrate.

The light source may include a light emitting diode (LED) chip configured to emit light and a housing configured to cover the LED chip, wherein the housing has a thermal conductivity greater than a thermal conductivity of the glass substrate.

The light source may have a front portion that contacts the rear surface of the glass substrate, and a rear portion that contacts a front surface of the rear chassis.

A side of the glass substrate that is opposite to the rear surface of the display panel may be coupled to the light source.

The glass substrate may include a long side extending in a second direction perpendicular to a first direction in which the light source emits the light through the glass substrate toward a rear surface of the display panel.

The light source may be configured to emit light in a first direction through the glass substrate toward a rear surface of the display panel.

The light emitted from the light source may be diffusely emitted from the light source module in the first direction.

The glass substrate may include a plurality of substrates that are spaced apart from each other in a third direction perpendicular to the first direction and the second direction.

BRIEF DESCRIPTION OF THE DRAWINGS

The above and other aspects, features, and advantages of certain embodiments of the present disclosure will become apparent and more readily appreciated from the following description taken in conjunction with the accompanying drawings, in which.

DETAILED DESCRIPTION

Figure 1:
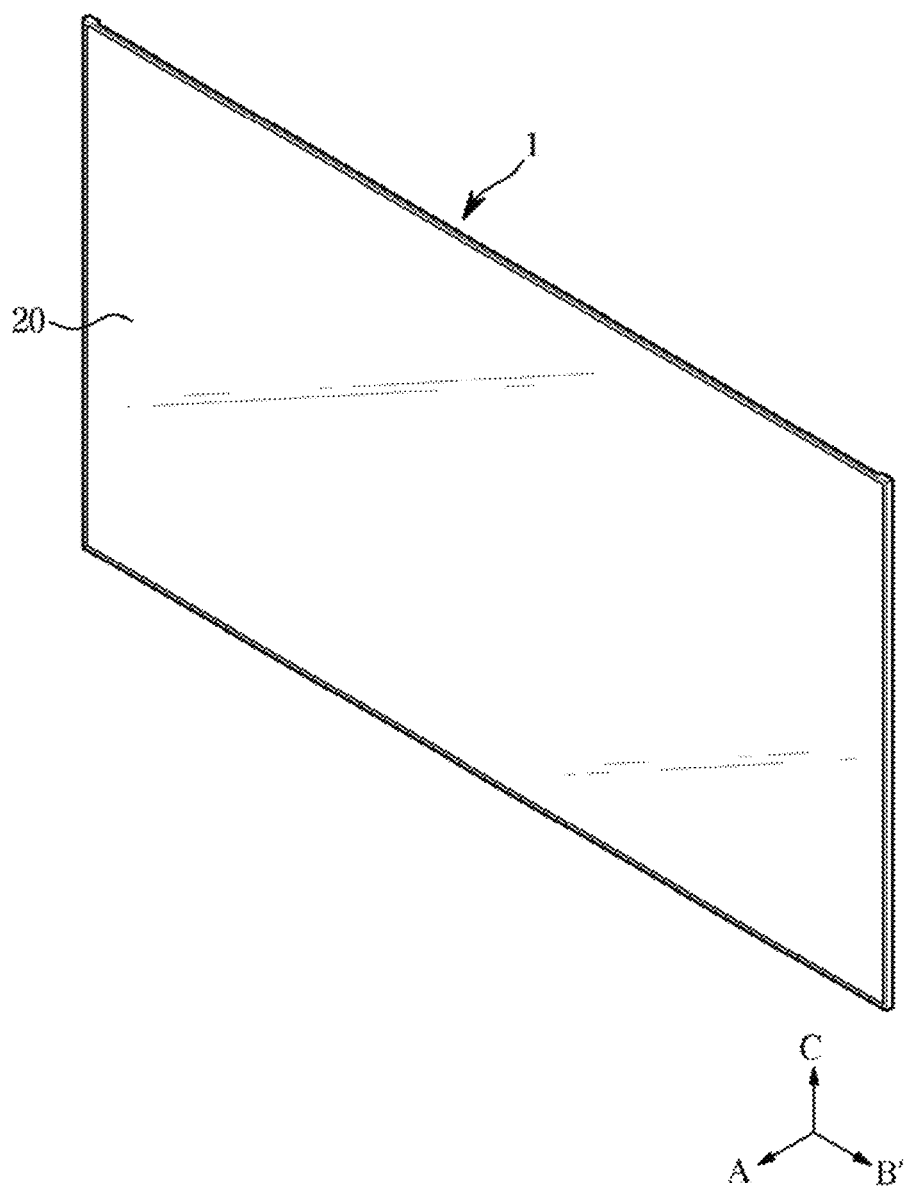
FIG. 1 is a perspective view illustrating a display apparatus according to an embodiment.

The embodiments set forth herein and illustrated in the drawings are examples such that it should be understood that they may be replaced with various equivalents and modifications. With regard to the description of the drawings, similar reference numerals may be used to designate similar or relevant elements.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure.

The terms "front", "rear", "upper", "lower", "top", and "bottom" as herein used are defined with respect to the drawings, but the terms may not restrict the shape and position of the respective components.

Display apparatus collectively refers to a device that displays an image. The display apparatus may include a television, a monitor, a mobile device, and the like. Hereinafter, a television will be described as an example of a display apparatus. The television may include a flat television, a curved television, a bendable television, and the like. The following description will be mainly made in relation to a flat television as an example of a television.

Figure 2:
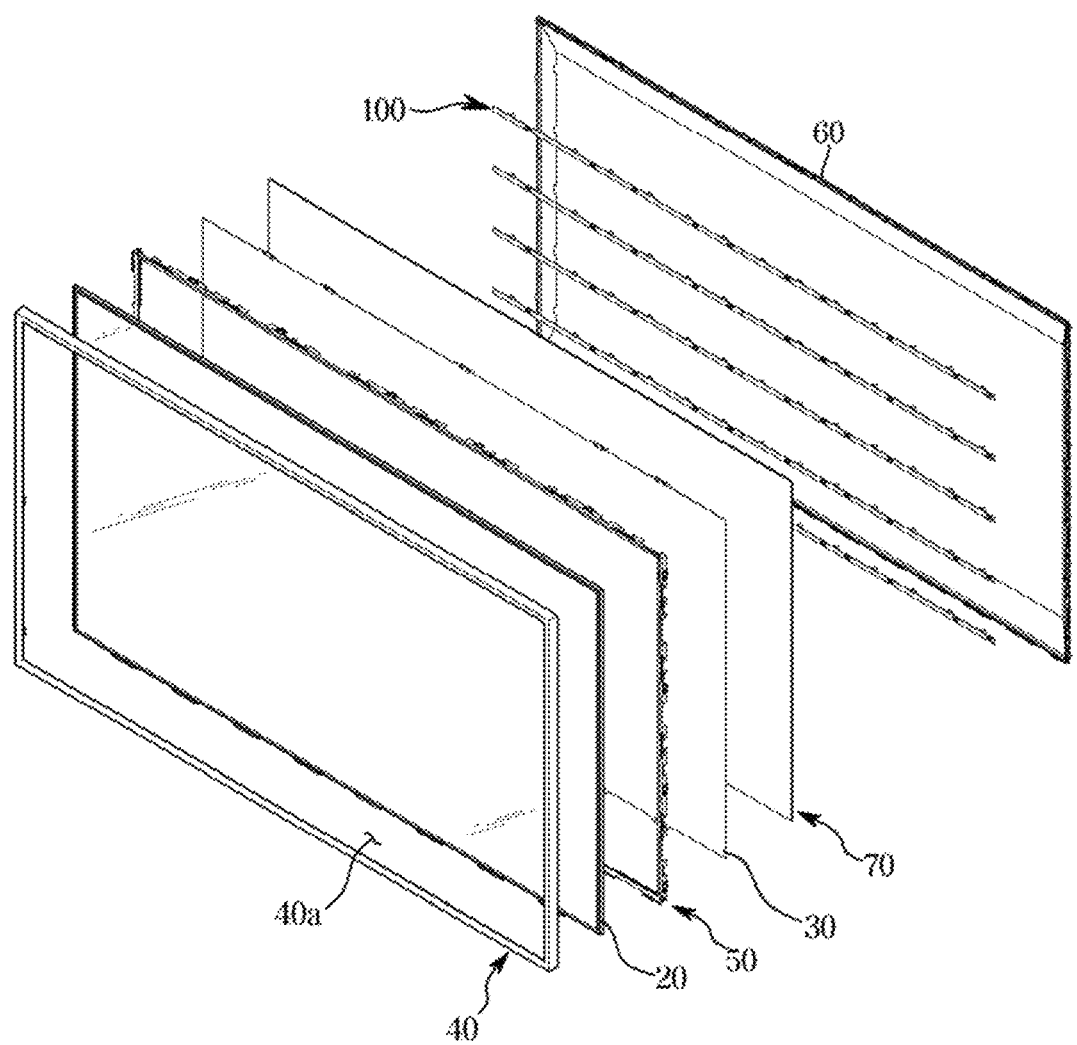
FIG. 2 is an exploded perspective view illustrating a display apparatus according to an embodiment.
Figure 3:
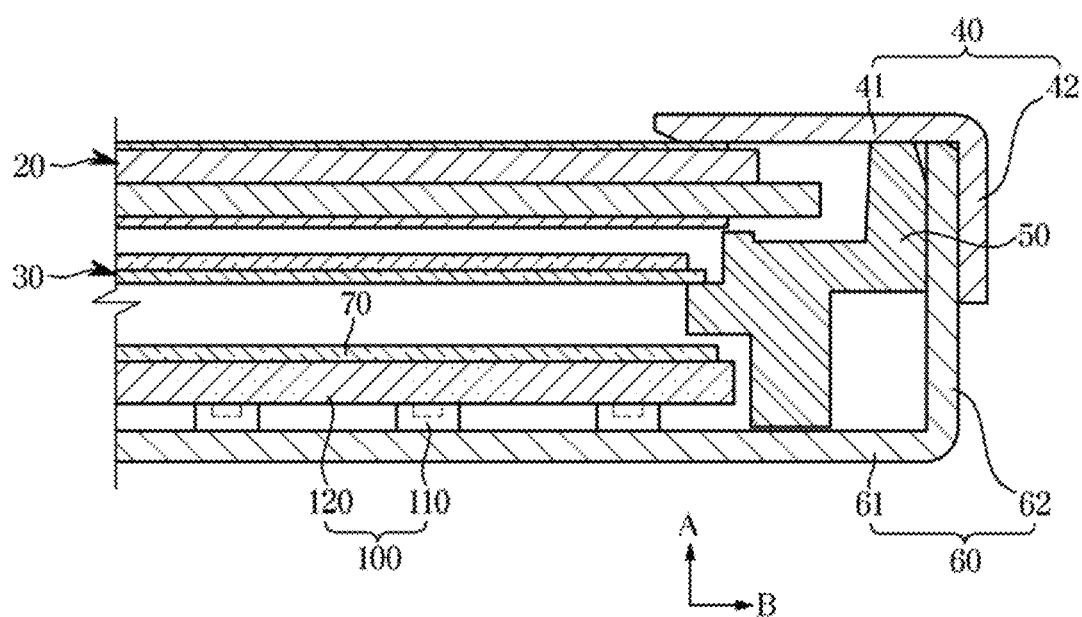
FIG. 3 is a cross-sectional view illustrating some components of a display apparatus according to an embodiment.

FIG. 1 is a perspective view illustrating a display apparatus according to an embodiment, FIG. 2 is an exploded perspective view showing a display apparatus according to an embodiment, and FIG. 3 is a cross-sectional view showing some components of a display apparatus according to an embodiment.

Referring to FIGS. 1 to 3, a display apparatus 1 may include a display panel 20 and a chassis assembly that accommodates and supports a backlight unit.

The display panel 20 may include a liquid crystal panel formed by encapsulating liquid crystal molecules between two glass substrates having respective electrodes, and may display an image in a forward direction.

The display panel 20 may display an image in a first direction A, that is, a forward direction.

The chassis assembly may include a front chassis 40, a middle mold 50, and a rear chassis 60.

The front chassis 40 may include an opening 40a through which the display panel 20 is exposed. The front chassis 40 may include a bezel portion 41 covering a front peripheral side of the display panel 20 and a top side portion 42 bent rearward from an end portion of the bezel portion 41 to cover a side surface of the middle mold 50.

The front chassis 40 may be coupled to a front side of the middle mold 50 to maintain a state in which the display panel 20 is installed on the middle mold 50.

The display panel 20 and the front chassis 40 sequentially provided in front of the middle mold 50, and the rear chassis 60 may be provided behind the middle mold 50, to allow the display panel 20 and the rear chassis 60 to be kept spaced apart from each other while supporting the respective components.

The rear chassis 60 may include a rear surface portion 61 and a bottom side surface portion 62 extending forward from a periphery of the rear surface portion 61 to be coupled to the middle mold 50.

The rear chassis 60 may be provided in a high-strength polygonal plate shape, and may include a metal material (for example, aluminum or an aluminum alloy, etc.) having a small thermal deformation from heat generated by a light source module 100 and/or the display panel 20 accommodated therein.

The rear chassis 60 may include a material having high thermal conductivity. Accordingly, heat generated from the light source module 100 may be easily dissipated to improve the reliability of the display apparatus 1.

The rear chassis 60 may be formed of a plastic material (e.g., polycarbonate: PC) or formed by adding glass fiber to a plastic material.

However, unlike the embodiment of FIGS. 1, 2, and 3, at least one of the front chassis 40 and the middle mold 50 may be omitted, or may be integrally formed with each other.

The display apparatus 1 may further include a housing surrounding the chassis assembly to protect and accommodate the chassis assembly or a rear cover covering the rear side of the rear chassis 60.

Inside the housing, a power supply board for supplying power to the display apparatus 1, a signal processing board for processing various image and sound signals, and a timing control board for transmitting image signals to the display panel 20 may be disposed.

The display apparatus 1 may further include a backlight unit provided to supply light to the display panel 20.

The light source module 100 may include a light source 110 that emits light.

The backlight unit may be a direct type backlight unit in which the light source 110 is positioned behind the display panel 20 as shown in the embodiment of FIGS. 1, 2, and 3. The backlight unit may include the light source module 100 including the light source 110 and a substrate 120 on which the light source 110 is mounted, and various optical sheets 30 arranged on an optical movement path of light emitted from the light source module 100.

The light source 110 may be provided as a light emitting diode (LED) package accommodating LEDs that emit light. The light source module 100 may be provided to supply light to the display panel 20. The light source module 100 may supply light to the display panel 20 from the rear side of the display panel 20. The light source module 100 may be arranged at a side in a direction opposite to the first direction A with respect to the display panel 20, that is, at the rear side of the display panel 20.

The light source of the light source module 100 may be provided as a mini-LED formed of an LED chip having a size of 100 to 300 µm.

Alternatively, a cold cathode fluorescent lamp (CCFL) or an external electrode fluorescent lamp (EEFL) may be used as a light source.

The substrate 120 may have a bar shape extending in a second direction B perpendicular to the first direction A, in other words, extending in a left-right direction. That is, the substrate 120 may have a length portion extending in the left-right direction or in the second direction B.

The substrate 120 may include a glass material. However, embodiments are not limited thereto, and the substrate 120 may include a material having other physical properties.

The display apparatus may include multiple substrates 120 that may be spaced apart from each other in a third direction C perpendicular to the first direction A and the second direction B.

Since the plurality of substrates 120 may have the same configuration, the following description will be made in relation to one substrate 120 of the plurality of substrates 120.

The substrate 120 may be coupled to the rear chassis 60. The substrate 120 may be coupled to the rear chassis 60 such that the light source 110 emits light toward the display panel 20.

The substrate 120 may be provided with a plurality of the light sources 110 mounted thereon while being spaced apart from each other along the second direction B at predetermined intervals. Since the plurality of light sources 110 have the same configuration, the following description will be made in relation to one light source 110 among the plurality of light sources 110.

The substrate 120 may have a circuit pattern configured to transmit driving power and signals to the light source 110.

Light emitted from the light source module 100 may be directly supplied to the display panel 20 unlike that in the edge type display apparatus. In this case, the optical sheets 30 may be disposed between the light source module 100 and the display panel 20 to improve the characteristics of light emitted from the light source module 100.

The optical sheets 30 may include a prism sheet and a protective sheet.

The prism sheet may include a prism pattern in a triangular prism shape, and the prism patterns may be arranged adjacent to each other while forming a plurality of band shapes. The prism patterns may be formed in a pattern of rows in which crests and troughs are repeated while protruding toward the display panel. Light diffused by the light source module 100 may be refracted while passing through the prism pattern, so that the light may be introduced to the display panel in the vertical direction.

The protective sheet is configured to protect various components from external impacts or foreign substances. Particularly, the protective sheet may protect the prism sheet, which is vulnerable to scratches, from scratches.

The display apparatus 1 may include a light conversion member 70 provided to change a wavelength of light emitted from the light source module 100.

The light conversion member 70 may be disposed between the display panel 20 and the light source module 100. As light emitted from the light source module 100 passes through the light conversion member 70, the wavelength of the transmitted light is changed, and the changed light may be introduced into the display panel 20.

The light source module 100 may emit blue-based light. In this case, the blue-based light may refer to light partly biased toward green. Blue light generated by the light source module 100 may be converted into white light through the light conversion member 70.

The light conversion member 70 may include a quantum dot (QD).

The light conversion member 70 may convert a color of light emitted from the light source module 100 and incident thereon, and may emit light of a different color. For example, the light conversion member 70 may convert blue light emitted from the light source module 100 and incident thereon into red light and green light (or yellow light) through various quantum dots and then emit the color converted light to the outside. Specifically, the light conversion member 70 may emit light of a color different from that of the incident light by changing the wavelength of the incident light (wavelength shift).

Quantum dots, when a voltage is applied thereto, may emit light by themselves or absorb light to thereby emit light of a specific wavelength.

Electrons of a quantum dot are located at a low energy level (or a low energy band) in a stable state. In this case, when the quantum dot absorbs light from the outside, the electrons of the low energy level move to a high energy level (or a high energy band). Since the electrons at the high energy level are unstable, the electrons naturally move from the high energy level to the low energy level. As such, while moving from the high energy level to the low energy level, the electrons emit light corresponding to an energy difference between the high energy level and the low energy level. In this case, the wavelength of the emitted light is determined by the energy difference between the high energy level and the low energy level.

Particularly, the smaller the size of the quantum dot, the shorter wavelength light may be emitted, and the larger the size, the longer wavelength light may be emitted. For example, a quantum dot with a diameter of 2 nanometers (nm) may emit blue light, and a quantum dot with a diameter of approximately 10 nm may emit red light.

In addition, when quantum dots of various sizes are used, the quantum dots may output light of various wavelengths from red light to blue light. In other words, when quantum dots of various sizes are used, light having a natural color may be generated.

The light conversion member 70 may be manufactured by dispersing the above-described quantum dots in a resin. When light is incident from the light source module 100 to the light conversion member 70, the incident light excites electrons of the quantum dots included in the light conversion member 70. In other words, electrons of a low energy level (or a low energy band) move to a high energy level (or a high energy band) by the incident light.

Thereafter, as the excited electrons move from the high energy level to the low energy level, the quantum dots output light of various wavelengths depending on the sizes. As such, light of various wavelengths may pass through the display panel 20 to generate an image.

Accordingly, when blue light emitted from the light source module 100 is introduced to the light conversion member 70, green based light and red based light may be emitted by a green light quantum dot and a red light quantum dot.

Finally, due to blue light emitted from the light source module 100 and green light and red light emitted from the light conversion member 70, white light having a mixture of three different wavelengths of light may be introduced to the display panel 20.

Unlike the conventional display apparatuses, recent display apparatuses are developed as ultra-slim display apparatuses having a thin thickness in the first direction A. In this case, as the thickness of the display apparatus is reduced, the separation distance between components inside the display apparatus may be reduced.

In a related art display apparatus, a backlight unit may include a diffusion sheet that diffuses light emitted from a light source module in all directions to transmit a uniform amount of light to a display panel in all directions.

As the display apparatuses become slimmer, the separation distance between the light source module and the diffusion sheet becomes narrow, and thus the amount of light emitted to the diffusion sheet may decrease due to the emitting angle of light.

In addition, as the separation distance between the light source module and the light conversion member including the quantum dots becomes narrow, high temperature heat generated from the light source is easily transferred to the light conversion member, and thus the characteristics of the quantum dots of the light conversion member change, resulting in poor performance. In detail, as an inorganic material surrounding the quantum dot is separated due to high temperature heat, a light emitting area of the quantum dot is reduced, and thus the light emission efficiency is reduced, and the overall performance may be deteriorated.

In particular, since the substrate of the light source module is formed of a material having a low thermal conductivity, such as a glass material, heat dissipation of high temperature heat generated from the light source module is not effectively performed. As a result, the reliability of the display apparatus may be degraded.

In the related art display apparatus, a rear chassis having superior thermal conductivity is coupled to a light source module for heat dissipation of the light source module, but heat generated from the LED package may not be easily transferred to the rear chassis through the substrate having a low thermal conductivity, thus having a difficulty in heat dissipation.

In order to remove such limitations, the light source module 100 according to an embodiment may transmit a uniform amount of light toward the display panel 20 and enable efficient heat dissipation through the rear chassis 60 even when a separation distance between components is narrow.

Hereinafter, the light source module 100 according to an embodiment will be described in detail.

Figure 4:
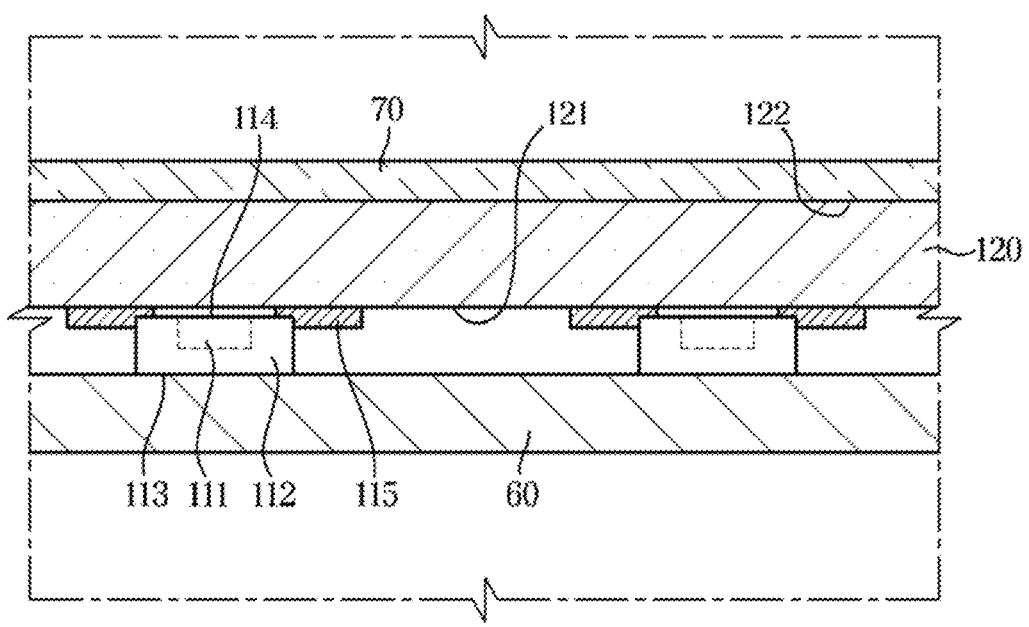
FIG. 4 is an enlarged view of illustrating the components shown in FIG. 3.

FIG. 3 is a cross-sectional view showing some components of a display apparatus according to an embodiment, and FIG. 4 is an enlarged view showing the components shown in FIG. 3.

Referring to FIGS. 3 and 4, the light source module 100 may include the substrate 120 arranged to face the display panel 20 in the first direction A, which is a forward direction, and the light source 110 mounted on a mounting surface 121 of the substrate 120 facing in the direction opposite to the first direction A, which is a rearward direction.

The mounting surface 121 may form a rear surface of the substrate 120 in the front-rear direction.

The substrate 120 may be formed of a glass material as described, and may include an exit surface 122 facing the display panel 20 in the first direction A and through which light emitted from the light source 110 exits. Light emitted from the light source 110 may be transmitted to the display panel 20.

The exit surface 122 may form a front surface of the substrate 120 in the front-rear direction.

The light source module 100 may be provided such that the substrate 120 and the light source 110 are sequentially arranged in the direction opposite to the first direction A. Accordingly, the display panel 20, the substrate 120, the light source 110, and the rear chassis 60 may be sequentially arranged inside the display apparatus 1 in the direction opposite to the first direction A.

The light source 110 may include the LED chip 111 from which light is generated. The light source 110 may include an emitting surface 114 through which light generated from the LED chip 111 is emitted.

The emitting surface 114 may face in the first direction A. The emitting surface 114 may face the substrate 120.

The light source 110 may include a housing 112 that covers the LED chip 111 and has the emitting surface 114.

The light source 110 may be in direct contact with the rear chassis 60. A surface of the light source 110 in the direction opposite to the first direction A may be in contact with the rear chassis 60.

The light source 110 may include a contact surface 113 arranged opposite to the emitting surface 114, and the contact surface 113 may be in direct contact with the rear chassis 60.

Here, the expression "direct contact" may include both a case where the contact surface 113 is in contact with the rear chassis 60 without having any member therebetween and a case where the contact surface 113 is in contact with the rear chassis 60 through a contact member.

The housing 112 may be formed of a material having a superior thermal conductivity than the substrate 120.

High temperature heat generated when the LED chip 111 emits light may be directly transferred to the rear chassis 60 along the housing 112. Accordingly, compared to when heat generated from the light source 110 is transferred to the rear chassis 60 through the substrate 120, the heat generated from the light source 110 may be more efficiently dissipated.

In related displays, components of a light source module are arranged in the order of a light source, a substrate, and a rear chassis in the direction opposite the first direction A. Accordingly, heat generated from the light source is transferred to the rear chassis through the substrate.

In this case, as described above, when the substrate is formed of a material having low thermal conductivity, high temperature heat generated from the light source may be transferred not to the rear chassis through the substrate, but to another component disposed adjacent to the light source.

In other words, since heat generated from the light source is shielded by the substrate, the heat may be transferred not to the chassis disposed behind the light source, but to the front of the light source, resulting in thermal discoloration of the light conversion member, or expansion of the diffusion sheet, and thus resulting in lower reliability of the display apparatus.

However, the light source module 100 according to an embodiment is provided such that the light source 110 is in direct contact with the rear chassis 60 so that heat generated from the light source 110 is directly transferred to the rear chassis 60, and thus the efficiency of heat dissipation may be increased.

That is, the surface of the substrate on which the light source 110 is mounted may be the opposite to the direction that the light source 110 emits light. The side of the light source 110 that is mounted on the substrate 120 may be the opposite to the direction in which the light source 110 emits light, that is, the first direction A toward the display panel 20.

The light source 110 may include a coupler 115 coupled to the substrate 120. The coupler 115 may be provided to allow a lead of the light source 110 to be in contact with a printed circuit of the substrate 120. The coupler 115 may be formed as a lead frame of the light source 110.

The coupler 115 and the emitting surface 114 of the light source 110 may be provided on the same side of the housing 112. The coupler 115 and the emitting surface 114 of the light source 110 may be disposed at one end of the housing 112 in the first direction A.

Accordingly, the light source 110 may emit light in the first direction A while being mounted on the mounting surface 111 of the substrate 120 that faces in the direction opposite to the first direction A.

That is, the light source module 100 may be provided such that light emitted from the light source 110 is transmitted through the substrate 120 in the first direction A and directed to the display panel 20.

In addition, the substrate 120 may be provided on the display apparatus 1 such that the light source 110 is closer to the rear chassis 60 than the substrate 120 is, specifically, such that the light source 110 is in direct contact with the rear chassis 60.

Accordingly, the substrate 120 may be spaced apart from the rear chassis 60. The distance between the substrate 120 and the rear chassis 60 may be longer than the distance between the light source 110 and the rear chassis 60 in the direction opposite to the first direction A.

As described above, the substrate 120 may be formed of a glass material and may transmit light therethrough. However, the substrate 120 may include an opaque material so that transparency is lowered.

Light transmitted through the substrate 120 may be emitted through the exit surface 122 while being diffused by the opaque material of the substrate 120.

When the light emitted from the light source module 100 directly enters the eyes of a viewer, a pattern of arrangement of the plurality of light sources 110 may be perceived by the eyes The substrate 120 may diffuse the transmitted light to offset or minimize such an effect.

The exit surface 122 of the substrate 120 may include patterning to further diffuse light transmitted through the exit surface 122. As the light passing through the exit surface 122 is subject to additional diffuse-reflection by the patterning, light may be uniformly emitted in all directions.

As such, the substrate 120 may diffuse light passing through the substrate 120 and thus serve as a diffusion sheet.

Therefore, according to an embodiment light emitted from the light source 110 may be diffusely introduced to the display panel 20 using the substrate 120 without including a diffusion sheet.

By excluding the diffusion sheet, the effect of the diffusion sheet being expanded by heat generated from the light source module 100 is avoided, and without the diffusion sheet, the display apparatus 1 may be slimmer in the first direction A.

The emitting surface 114 of the light source 110 may be in contact with the substrate 120 or at a fine separation from the substrate 120. Accordingly, most of the light emitted from the light source 110 may be transmitted through the substrate 120 without being reflected from an incident surface (or the mounting surface 121) of the substrate 120, so that light efficiency may be enhanced.

That is, since the light source 110 emits light toward the substrate 120 that is spaced apart by a significantly small distance, and the emitted light is transmitted through the substrate 120 at a small incident angle on the incident surface of the substrate 120, most of the emitted light may be transmitted into the substrate 120 without being reflected from the incident surface of the substrate 120.

Accordingly, the display apparatus 1 may exclude a reflective sheet provided in related display apparatus.

The reflective sheet of the related display apparatus is provided to reflect the light reflected from an incident surface of the diffusion sheet back to the diffusion sheet when light emitted from the light source module is incident on the diffusion sheet at a large incident angle.

However, in the display apparatus 1 according to an embodiment, since most of the light emitted from the light source 110 is not reflected but transmitted through the substrate 120 as described above, the need for a reflective sheet may be reduced.

The light conversion member 70 may be disposed on the exit surface 122 of the substrate 120. That is, the light conversion member 70 may be disposed on the first direction A side of the substrate 120. The light conversion member 70 may be disposed adjacent to the light source module 100. As described above, since the thermal conductivity of the substrate 120 is low, the amount of heat dissipated through the rear chassis 60 is larger than the amount of heat conducted through the substrate 120, so that the light conversion member 70, even when placed on the light source module 100, may avoid being thermally discolored.

Since the light conversion member 70 is disposed on the exit surface 122 of the substrate 120, light emitted from the exit surface 122 may directly pass through the light conversion member 70, so that the light efficiency of the display apparatus 1 may be increased.

Hereinafter, a display apparatus 1 according to another embodiment will be described. Components other than an intermediate member 80 of the display apparatus 1 described below are the same as those of the display apparatus 1 according to the above-described embodiment, and thus redundant descriptions will be omitted.

Figure 5:
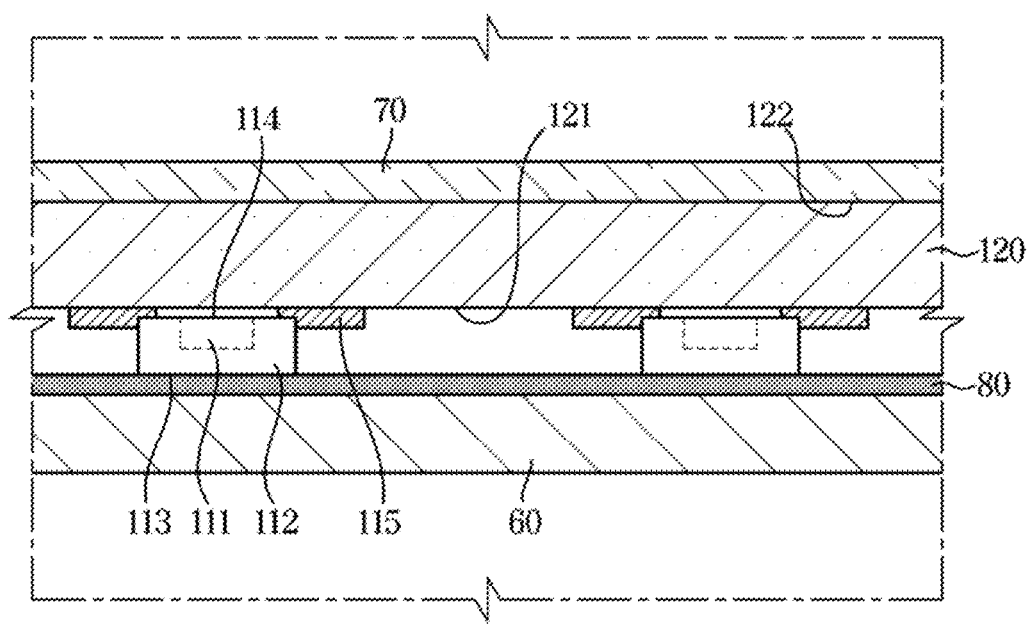
FIG. 5 is a cross-sectional view illustrating some components of a display apparatus according to another embodiment.

FIG. 5 is a cross-sectional view showing some components of a display apparatus according to another embodiment.

The display apparatus 1 of FIG. 5 may include an intermediate member 80 arranged between the light source 110 and the rear chassis 60.

The intermediate member 80 may be formed of a contactable material that brings the light source 110 into contact with the rear chassis 60.

The intermediate member 80 may be formed of an elastic material. Accordingly, the intermediate member 80 may be provided to absorb an external force, which may be generated in the display apparatus 1 and transmitted to the light source 110.

The intermediate member 80 may be provided to have a thermal conductivity higher than that of the substrate 120.

Accordingly, heat generated from the light source 110 may be conducted to the rear chassis 60 through the intermediate member 80 rather than through the substrate 120.

Hereinafter, a display apparatus 1 according to another embodiment will be described. Components other than an intermediate member 90 of the display apparatus 1 described below are the same as those of the display apparatus 1 according to the above-described embodiments, and thus redundant descriptions will be omitted.

Figure 6:
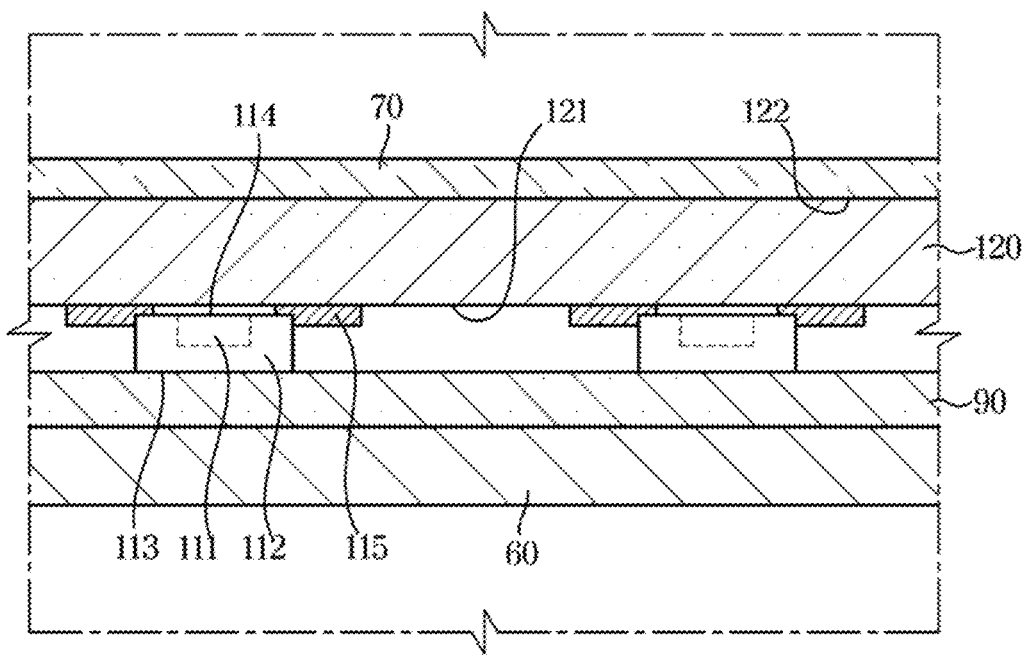
FIG. 6 is a cross-sectional view illustrating some components of a display apparatus according to another embodiment.

FIG. 6 is a cross-sectional view showing some components of a display apparatus according to an embodiment.

The display apparatus 1 according to an embodiment may include an intermediate member 90 disposed between the light source 110 and the rear chassis 60.

The intermediate member 90 may act a heat-sink.

The intermediate member 90 may efficiently transfer heat generated from the light source module 100 to the rear chassis 60 to dissipate the high temperature heat generated from the light source module 100 to the outside.

Figure 7:
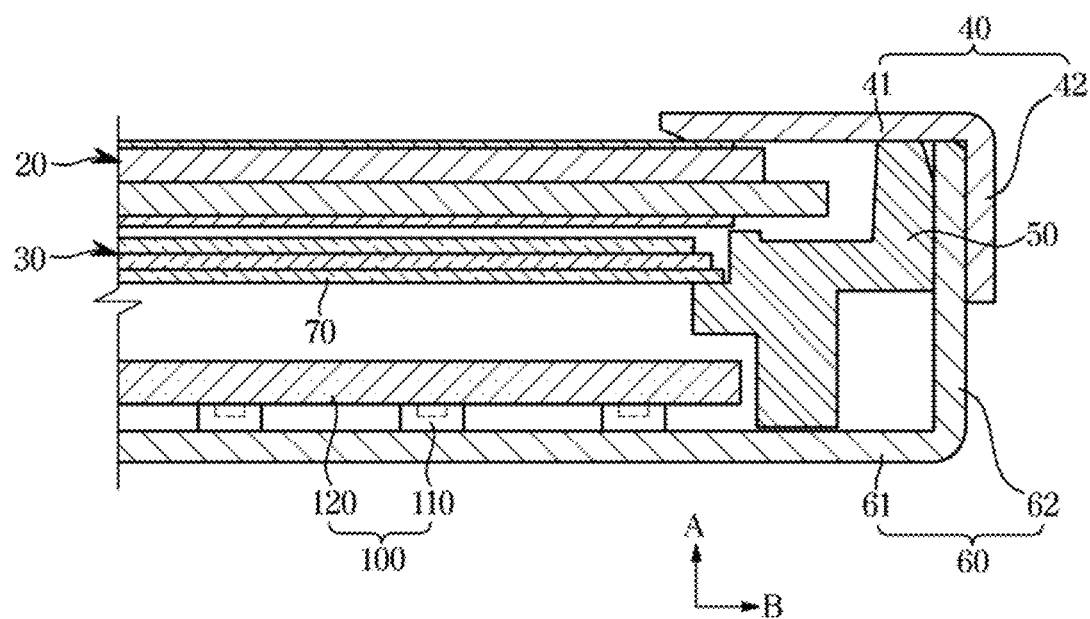
FIG. 7 is a cross-sectional view illustrating some components of a display apparatus according to another embodiment.

Hereinafter, as shown in FIG. 7, a display apparatus 1 according to another embodiment will be described. Components other than a light conversion member 70 of the display apparatus 1 described below are the same as those of the display apparatus 1 according to the above-described embodiments, and thus redundant descriptions will be omitted.

The light conversion member 70 may be spaced apart from the light source module 100 in the first direction A. The light conversion member 70 may be arranged to be in contact with the optical sheet 30. The light conversion member 70 may be supported by the middle mold 50 together with the optical sheet 30.

However, embodiments are not limited thereto, and the light conversion member 70 may be arranged to be spaced apart from the optical sheet 30, and may be supported by the middle mold 50 separately from the optical sheet 30.

As discussed above, according to an embodiment, the substrate of the light source module may be formed of a glass material, and the LED package may be arranged below the substrate with respect to the emitting direction of the LED, so that the LED package is easily brought into contact with the rear chassis, thereby allowing heat generated from the LED package to be efficiently dissipated through the rear chassis.

According to an embodiment, the substrate of the light source module may be formed of a glass material, and light emitted from the LED may be transmitted through the glass material and directed to the display panel, where light transmitted through the substrate is diffused so that the display apparatus does not require a separate diffusion sheet.

According to an embodiment, the separation distance between the light source module and the display panel may be reduced, thereby enabling the display apparatus to be slimmer.

Although few embodiments have been shown and described, the above example embodiments are provide for illustrative purpose only, and it would be appreciated by those skilled in the art that changes and modifications may be made in these example embodiments without departing from the principles and scope of the disclosure, the scope of which is defined in the claims and their equivalents.

What is claimed is:

1. A display apparatus comprising:
a display panel configured to display an image;
a light source module provided behind a rear surface of the display panel and configured to emit light to the display panel, the light source module comprising a glass substrate and a plurality of light sources provided behind a rear surface of the glass substrate;
a middle mold supporting the display panel; and
a rear chassis covering the display panel and the light source module, and coupled to the middle mold,
wherein each of the plurality of light sources comprises:
a light-emitting diode (LED) chip configured to generate light; and
a housing fully surrounding a rear surface and side surfaces of the LED chip, and
wherein an empty space exists between a front surface of the housing and the glass substrate, and a rear surface of the housing directly contacts a front surface of the rear chassis.

2. The display apparatus of claim 1, wherein each of the plurality of light sources is configured to emit light from a side that is coupled to the glass substrate.

3. The display apparatus of claim 2, wherein each of the plurality of light sources further comprises an emitting surface through which light is emitted and a coupler coupled to the glass substrate, and
wherein the emitting surface and the coupler are provided on the same side of each light source.

4. The display apparatus of claim 1, wherein the glass substrate is spaced apart from the rear chassis.

5. The display apparatus of claim 4, wherein the rear surface of the glass substrate and the rear chassis are spaced apart from each other by a length that is greater than a length that a rear end of each of the plurality of light sources is spaced apart from the rear chassis.

6. The display apparatus of claim 1, wherein the light emitted from each of the plurality of light sources is transmitted through the glass substrate and towards the display panel.

7. The display apparatus of claim 5, wherein light incident on the glass substrate, that is emitted from each of the plurality of light sources, is diffused and exits the glass substrate.

8. The display apparatus of claim 7, wherein the glass substrate comprises an opaque material.

9. The display apparatus of claim 7, wherein the glass substrate further comprises an exit surface arranged opposite to the rear surface and through which light exits in a direction towards the display panel, and
the exit surface comprises a pattern configured to diffuse light passing through the exit surface.

10. The display apparatus of claim 1, further comprising a light conversion member comprising a quantum dot particle, the light conversion member being configured to convert a property of light passing through the glass substrate,
wherein the light conversion member is provided between the rear surface of the display panel and the glass substrate.

11. The display apparatus of claim 10, wherein the light conversion member is provided on the glass substrate.

12. The display apparatus of claim 1,
wherein the housing has a thermal conductivity greater than a thermal conductivity of the glass substrate.

13. The display apparatus of claim 1, wherein each of the plurality of light sources has a front portion that contacts the rear surface of the glass substrate.

14. The display apparatus of claim 1, wherein a side of the glass substrate that is opposite to the rear surface of the display panel is coupled to the plurality of light sources.

15. The display apparatus of claim 14, wherein the glass substrate comprises a long side extending in a second direction perpendicular to a first direction in which the plurality of light sources emit the light through the glass substrate toward the rear surface of the display panel.

16. The display apparatus of claim 14, wherein each of the plurality of light sources is configured to emit light in a first direction through the glass substrate toward the rear surface of the display panel.

17. The display apparatus of claim 16, wherein the light emitted from each of the plurality of light sources is diffusely emitted from the light source module in the first direction.

18. The display apparatus of claim 15, wherein the glass substrate includes a plurality of substrates that are spaced apart from each other in a third direction perpendicular to the first direction and the second direction.

* * * * *